(12) United States Patent
Hanazato

(10) Patent No.: US 7,242,494 B2
(45) Date of Patent: Jul. 10, 2007

(54) PRINTING DEVICE, PRINTING METHOD, AND COMPUTER-READABLE STORAGE MEDIUM FOR PRINTING USING MULTIPLE PRINTERS

(75) Inventor: Eiichi Hanazato, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 737 days.

(21) Appl. No.: 10/665,118

(22) Filed: Sep. 22, 2003

(65) Prior Publication Data

US 2004/0057070 A1 Mar. 25, 2004

Related U.S. Application Data

(63) Continuation of application No. PCT/JP01/02244, filed on Mar. 21, 2001.

(51) Int. Cl.
G06F 15/00 (2006.01)
G06K 15/02 (2006.01)

(52) U.S. Cl. .................................... 358/1.15; 358/532

(58) Field of Classification Search .............. 358/1.1, 358/1.9, 1.15, 1.18, 532, 474, 404, 498, 1.8, 358/1.11, 1.12; 347/19
See application file for complete search history.

(56) References Cited

U.S. PATENT DOCUMENTS

| 3,576,367 A | * | 4/1971 | Sable | 347/140 |
| 4,774,524 A | | 9/1988 | Warbus et al. | 346/44 |
| 5,680,742 A | * | 10/1997 | Hidding | 53/411 |
| 6,106,094 A | | 8/2000 | Otani et al. | 347/19 |
| 6,708,612 B1 | * | 3/2004 | Schmid | 101/183 |

FOREIGN PATENT DOCUMENTS

| JP | A 1-222895 | 9/1989 |
| JP | U 4-37354 | 3/1992 |
| JP | A 6-305218 | 11/1994 |
| JP | A 8-192524 | 7/1996 |
| JP | A 9-136411 | 5/1997 |
| JP | A 9-240120 | 9/1997 |
| JP | A 11-320923 | 11/1999 |

* cited by examiner

Primary Examiner—Gabriel I. Garcia
(74) Attorney, Agent, or Firm—Oliff & Berridge, PLC

(57) ABSTRACT

A printing device includes a first printer and a second printer which continuously print one or plural pieces of printing data onto a printing medium. In the printing device, the second printer includes a reading sensor, the first printer first prints the one or plural pieces of printing data onto the printing medium by forming a mark indicating a page of the printing medium or each of the plural pieces of the printing data, the reading sensor in the second printer subsequently reads the mark and matches printing surfaces of the printing medium to be printed by the first and second printers, and the second printer thereafter prints the printing data onto the printing medium. The printing device includes an information holding part which previously holds information on a relationship between the mark position and a size of the printing medium or a size of each of the plural pieces of printing data, and a mark position setting part which movably sets the mark position based on the information held in the information holding part in accordance with the size of the printing medium or the size of each of the plural pieces of printing data.

8 Claims, 10 Drawing Sheets

*FIG. 7*

| IMAGE SIZE (FCB LENGTH) | DISTANCE TO POSITION FOR WRITING MARK (INCH) | NUMBER OF EXPOSED RASTERS FOR EXPOSURE UNTIL MARK PRINTING(HEX) |
|---|---|---|
| 3 INCHES | XXXX | YYYY |
| 3 1/6 INCHES | XXXX | YYYY |
| 3 2/6 INCHES | XXXX | YYYY |
| 3 3/6 INCHES | XXXX | YYYY |

PRINTING DEVICE, PRINTING METHOD, AND COMPUTER-READABLE STORAGE MEDIUM FOR PRINTING USING MULTIPLE PRINTERS

CROSS REFERENCE TO RELATED APPLICATION

This is a Continuation of Application No. PCT/JP01/02244 filed Mar. 21, 2001. The entire disclosure of the prior application is hereby incorporated by reference herein in its entirety.

BACKGROUND OF THE INVENTION

1. Field of the Invention

The present invention relates to a printing device, a printing method, and a computer-readable storage medium, in which printing data is continuously printed, by use of plural printers (referred to as printer devices), to a printing medium having a continuous sheet or a roll sheet.

More particularly, the present invention relates to a method by which, in the case of continuous control for continuously printing printing data on the front surface and the back surface of the printing medium by use of two printers or for printing the printing data with two colors on a single surface (e.g., the front surface) of the printing medium, correct printing data is printed onto the printing medium by matching a printing surface of the printing medium which is printed by one printer to a printing surface thereof which is printed by the other printer.

2. Description of the Related Art

When a master printer prints one surface (e.g., front surface) of a continuous sheet or a roll sheet and a slave printer prints another surface (e.g., back surface) thereof and the two printers performs the continuous control operation, a mark indicating a page or printing data such as a barcode is generally formed onto one surface of the sheet in the case of printing on the master printer (ordinarily, referred to as page marking) and a reading sensor arranged to the slave printer reads the mark so as to match information on the printing data on the one surface of the sheet with information on the printing data on the other surface thereof (for the purpose of e.g., matching of the front and the back surfaces). When the image data is printed with two colors on the one surface (e.g., front surface) of the sheet by use of the master printer and the slave printer, that the one surface and the other surface become the same surface requires attention.

In other words, in the case of printing the sheet under the continuous control, the mark is read and it is recognized which printing data is printed on the one surface. Thereafter, the slave printer prints the correct printing data on the other surface of the sheet. Consequently, when the deflection of sheet, etc. causes any abnormal state during conveying the sheet to the slave printer from the master printer, the abnormal state is easily detected by the above matching. The printing data can be printed on the surface of the sheet without errors.

Here, it is typically assumed that the printing data is continuously printed on the front surface and the back surface of the sheet with two printers using electrostatic transfer. In this case, a surface of a photosensitive drum in the master printer is charged and then it is selectively exposed by laser beams, thereby forming an electrostatic latent image corresponding to desired image data. Next, the electrostatic latent image is developed by a developer and then it is transferred to the front surface of the sheet, thereby fixing and forming the image data onto the front surface of the sheet. At this stage, the printing data corresponding to the desired image data is printed onto the front surface of the sheet.

The electrostatic latent image and the image data are formed and the mark such as a barcode indicating the sheet page or image data is formed at a predetermined position on the sheet, thereby performing the page marking on the master printer side.

Further, a reading sensor arranged to the slave printer reads the mark and it is recognized which image data is formed onto the front surface of the sheet, thereby matching the image data on the front surface of the sheet to the image data on the back surface (matching of the front and back surfaces). As a result of the matching of the front and back surfaces, when it is confirmed that information on the image data on the back surface of the sheet is correct, the correct image data is formed onto the back surface of the sheet by a process similar to that for forming the image data on the front surface of the sheet on the master printer side as previously described.

Conventionally, the mark such as the barcode formed by the above-mentioned page marking is printed at an edge portion of the sheet such as a continuous sheet or a roll sheet (e.g., position of the perforation) or at a constant position from the head portion of the image data. During printing the printing data corresponding to the image data onto the front surface of the sheet, the sheet is continuously conveyed. In this case, the sheet size (or the size of the image data) is changed and then a positional relationship between the mark such as the barcode and the reading sensor in the slave printer is changed. Therefore, when the sheet conveying operation stops, the mark might stop just at the position of the reading sensor. Generally, the reading sensor has only a function for detecting the passage of the mark at the position of the reading sensor. Thus, when the mark stops at the position of the reading sensor, the sheet conveying operation starts again for the purpose of printing the back surface of the sheet and then the inconvenience is caused that the reading sensor correctly does not read the mark.

In order to prevent the inconvenience, the reading sensor arranged to the slave printer is a movable one and the position of the reading sensor is moved in parallel with the sheet conveying direction so as to prevent the mark position from being at the position of the reading sensor per sheet size or per size of the image data. Thus, the position of the reading sensor can movably be arranged so as not to locate the mark at the position of the reading sensor when the sheet conveying operation stops.

However, in this case, it is necessary to newly provide, in the slave printer, a mechanism part such as a driving unit for moving the position of the reading sensor in the printer. Generally, the structure of the mechanism part for moving the position of the reading sensor is complicated, and there are problems that the apparatus including the printer is increased in size, and the manufacturing costs of the apparatus rise. Here, the description is given of the case of continuously printing the printing data on the front surface and the back surface of the sheet by use of the two printers. Even in the case of printing the printing data with two colors onto one surface of the sheet by use of the two printers, the similar problems are caused.

SUMMARY OF THE INVENTION

The present invention has been made in view of the above problems and provides a printing device, a printing method, and a computer-readable storage medium, in which it is possible to prevent a mark such as a barcode from stopping at the position of a reading sensor when the sheet conveying operation stops without providing a mechanism part such as a driving means for moving the position of the reading sensor in the case of the continuous control operation for continuously printing the printing data on the front surface and the back surface of a printing medium such as a sheet by plural printers or for printing the printing data with two colors onto one surface of the printing medium.

In order to solve the problems, according to an aspect of the present invention, there is provided a printing device including a first printer and a second printer that continuously print printing data (image data to be printed) onto a printing medium, in which the second printer includes a reading sensor, the first printer first prints the printing data onto the printing medium by forming a mark indicating a page of the printing medium, the reading sensor subsequently reads the mark and matches printing surfaces of the printing medium to be printed by the first and second printers, and the second printer thereafter prints the printing data onto the printing medium. The printing device includes: an information holding part which previously holds information on a relationship between a size of the printing medium and a position of the mark; and a mark position setting part which movably sets the mark position based on the information held in the information holding part in accordance with the size of the printing medium.

According to another aspect of the present invention, there is provided a printing device including a first printer and a second printer that continuously print plural pieces of printing data onto a printing medium, in which the second printer includes a reading sensor, the first printer first prints the plural pieces of printing data onto the printing medium by forming a mark indicating each of the plural pieces of printing data, the reading sensor subsequently reads the mark and matches printing surfaces of the printing medium to be printed by the first and second printers, the second printer thereafter prints the plural pieces of printing data onto the printing medium. The printing device includes: an information holding part which previously holds information on a relationship between sizes of the plural pieces of printing data and a position of the mark; and a mark position setting part which movably sets the mark position based on the information held in the information holding part in accordance with the sizes of the plural pieces of printing data.

Preferably, in the printing device of the present invention, when, as a result of matching the printing surfaces of the printing medium to be printed by the first and second printers, it may be determined that the printing data on the printing surface to be printed by the first printer does not match the printing data on the printing surface to be printed by the second printer, printing operations of the first and second printers may stop and an occurrence of an abnormal state may be notified.

Further, according to another aspect of the present invention, there is provided a printing device including one printer having a first printing part, a second printing part, and a reading sensor, which continuously prints printing data onto a printing medium. In the printing device, the first printing part in the printer first prints the printing data onto the printing medium by forming a mark indicating a page of the printing medium, the reading sensor subsequently reads the mark and matches printing surfaces of the printing medium to be printed by the first and second printing parts, the second printing part in the printer thereafter prints the printing data onto the printing medium. The printing device includes: an information holding part which previously holds information on a relationship between a size of the printing medium and a position of the mark; and a mark position setting part which movably sets the mark position based on the information held in the information holding part in accordance with the size of the printing medium.

Furthermore, according to another aspect of the present invention, there is provided a printing device including one printer having a first printing part, a second printing part, and a reading sensor. In the printing device, th printer continuously prints plural pieces of printing data onto a printing medium, the first printing part in the printer first prints the plural pieces of printing data onto the printing medium by forming a mark indicating each of the plural pieces of printing data, the reading sensor subsequently reads the mark and matches printing surfaces of the printing medium to be printed by the first and second printing parts, and the second printing part in the printer thereafter prints the plural pieces of printing data onto the printing medium. The printing device includes: an information holding part which previously holds information on a relationship between a size of each of the plural pieces of printing data and a position of the mark; and a mark position setting part which movably sets the mark position based on the information held in the information holding part in accordance with the sizes of the plural pieces of printing data.

Preferably, in the printing device of the present invention, when, as a result of matching the printing surfaces of the printing medium to be printed by the first and second printing parts, it may be determined that the printing data on the printing surface to be printed by the first printing part does not match the printing data on the printing surface to be printed by the second printing part, printing operations of the printer may stop and an occurrence of an abnormal state may be notified.

In addition, according to another aspect of the present invention, there is provided a printing method that continuously prints printing data onto a printing medium, including the steps of: previously holding information on a relationship between an size of the printing medium and a position of the mark; movably setting the position of the mark based on the previously-held information in accordance with the size of the printing medium; forming the set mark upon printing the printing data onto a printing surface of the printing medium to be printed first; reading the mark by a reading sensor and matching printing surfaces of the printing medium to be printed first and second; and printing the printing data onto the printing surface of the printing medium to be printed second when it is determined that the printing data onto the printing surface of the printing medium to be printed first matches the printing data onto the printing surface of the printing medium to be printed second.

In addition, according to another aspect of the present invention, there is provided a printing method that continuously prints plural pieces of printing data, including the steps of: previously holding information on a relationship between sizes of the plural pieces of printing data and a position of a mark indicating the plural pieces of printing data; movably setting the mark position based on the previously-held information in accordance with the sizes of the plural pieces of printing data; forming the set mark upon printing the plural pieces of printing data onto a printing surface of the printing medium to be printed first; reading the mark by a reading sensor and matching printing surfaces of the printing medium to be printed first and second; and printing the plural pieces of printing data onto the printing surface of the printing medium to be printed second when it is determined that the plural pieces of printing data onto the printing surface of the printing medium to be printed first match the plural pieces of printing data onto the printing surface of the printing medium to be printed second.

In addition, according to another aspect of the present invention, there is provided a computer-readable storage medium that stores a program which continuously prints printing data onto a printing medium, wherein the program enables a computer to function as: means for previously holding information on a relationship between a size of the printing medium and a position of a mark indicating a page of the printing medium; means for movably setting the mark position based on the previously-held information in accordance with the size of the printing medium; means for forming the set mark upon printing the printing data onto a printing surface of the printing medium to be printed first; means for reading the mark by a reading sensor and matching printing surfaces of the printing medium to be printed first and second; and means for printing the printing data onto the printing surface of the printing medium to be printed second when it is determined that the printing data onto the printing surface of the printing medium to be printed first matches the printing data onto the printing surface of the printing medium to be printed second.

In addition, according to another aspect of the present invention, there is provided a computer-readable storage medium that stores a program which continuously prints plural pieces of printing data onto a printing medium, wherein the program enables a computer to function as: means for previously holding information on a relationship between sizes of the plural printing data and a position of a mark indicating each of the plural printing data; means for movably setting the mark position based on the previously-held information in accordance with the sizes of the plural printing data; means for forming the set mark upon printing the plural pieces of printing data onto a printing surface of the printing medium to be printed first; means for reading the mark by a reading sensor and matching the printing surfaces of the printing medium to be printed first and second; and means for printing the plural printing data onto the printing surface of the printing medium to be printed second when it is determined that the printing data onto the printing surface of the printing medium to be printed first matches the printing data onto the printing surface of the printing medium to be printed second.

Briefly, according to the present invention, in the case of continuously printing the printing data onto the printing medium such as the sheet by use of the plural printers, it is possible to prevent the mark position from being at the position of the reading sensor when the sheet conveying operation stops, by movably setting the mark position printed upon printing the printing data onto the printing surface of the sheet per sheet size or per size of the image data.

Therefore, according to the present invention, a mechanism part such as a driving means for moving the position of the reading sensor is not necessary, apparatuses including the printers are reduced in size, and costs for manufacturing the apparatuses are reduced.

BRIEF DESCRIPTION OF THE DRAWINGS

Preferred embodiments of the present invention will be described in detail based on the following, wherein:

FIG. 7 is a data format diagram showing data on a start position for writing a mark per size of image data;

DESCRIPTION OF THE PREFERRED EMBODIMENTS

Hereinbelow, a description is given of a method for continuous control of a conventional printer to which the present invention is not applied, so as to apparently understand advantages of the present invention.

Figure 1:
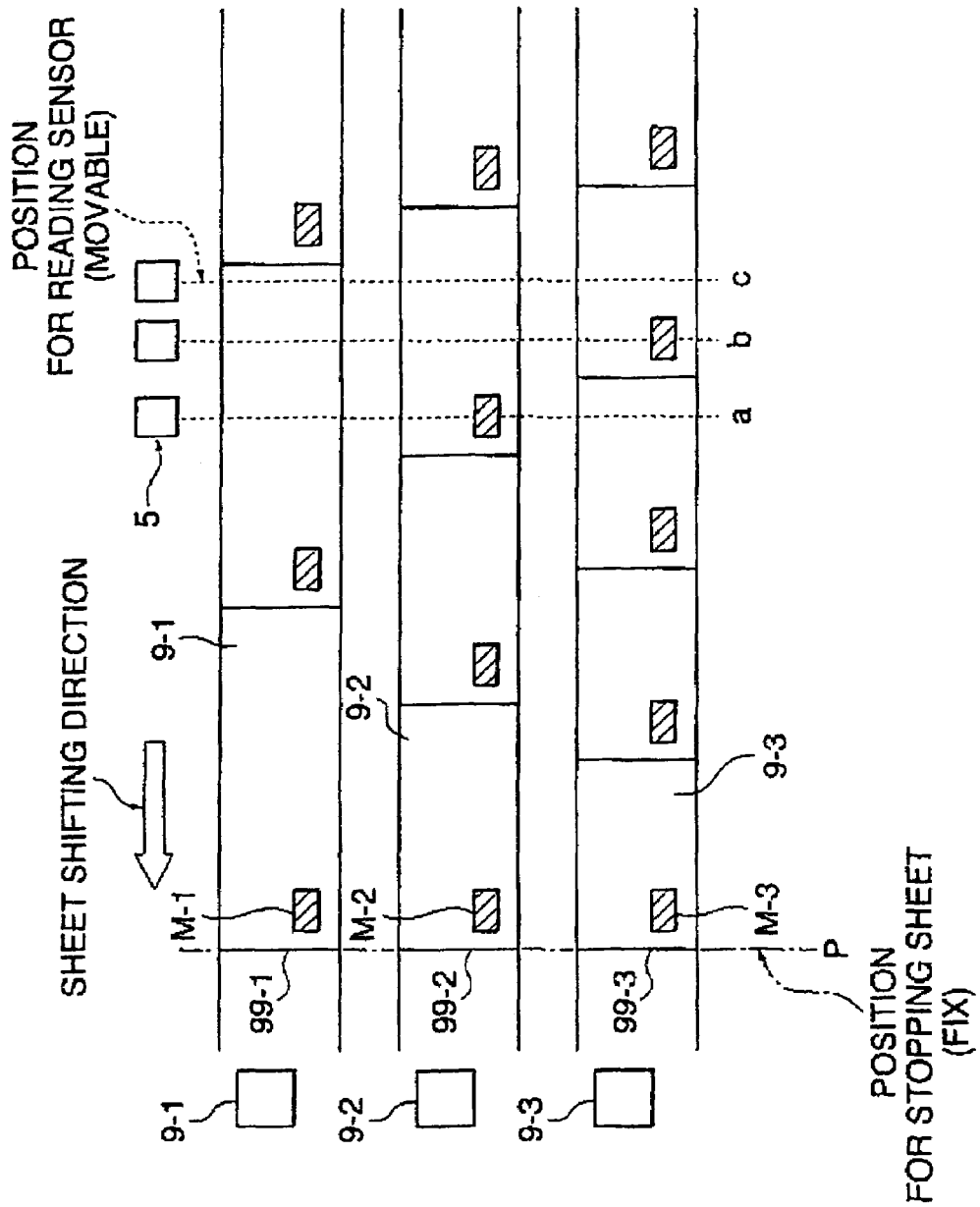
FIG. 1 is a schematic diagram for explaining a conventional method for continuous control operation of printers.

FIG. 1 is a schematic diagram for explaining a conventional method for continuous control operation of printers. Referring to FIG. 1, sheets 9-1 to 9-3 such as a continues sheet or a roll sheet, marks M-1 to M-3 such as a barcode, and a reading sensor 5 are enlargedly viewed for the purpose of a brief description. Further, it is assumed that, typically, plural printers are used and printing data is continuously printed onto the front surfaces and the back surfaces of the sheets 9-1 to 9-3.

When, under the continuous control of the plural printers, image data is printed onto the front surfaces and the back surfaces of the sheets 9-1 to 9-3, referring to FIG. 1, conventionally, the marks M-1 to M-3 are always formed at the same position from the positions of perforations 99-1 to 99-3 on the sheets 9-1 to 9-3 (or at the head portion of the image data to be printed). Further, when the sheet conveying operation stops, the sheets stop at a sheet stop position P which is always fixed.

In this case, the sizes of the sheets 9-1 to 9-3 (or size of the image data to be printed) is changed, thereby changing a positional relationship between the marks M-1 to M-3 and the reading sensor 5. Therefore, when the sheet conveying operation stops, the mark position is overlapped to the position of the reading sensor 5. Since the reading sensor 5 detects only the passage of the mark at the position of the reading sensor 5, the reading sensor 5 cannot correctly read the mark position when the sheet conveying operation starts again after stopping the mark at the position of the reading sensor 5.

When the reading sensor 5 is arranged at a position a, the marks M-1 and M-3 formed onto the sheets 9-1 and 9-3 can be read by the reading sensor 5. However, since the position of the mark M-2 on the sheet 9-2 is overlapped to the position of the reading sensor 5, the mark M-2 is not read by the reading sensor S. In order to prevent the inconvenience, the reading sensor 5 must be moved to a position b.

When the reading sensor 5 is arranged at the position b, the position of the mark M-3 on the sheet 9-3 is overlapped to the position of the reading sensor 5. Thus, the mark M-3 is not read by the reading sensor 5. In order to prevent the inconvenience, the reading sensor 5 must be moved at a position c.

When the reading sensor 5 is arranged at the position c, the three marks M-1 to M-3 are not overlapped to the position of the reading sensor 5. Therefore, all the marks M-1 to M-3 are read. However, since the sheet size is not limited to the above-mentioned three types and changes by a minute unit (e.g., ⅙ inch unit), there is a fear that the mark stops at the position of the reading sensor 5 depending on the sheet size when the reading sensor 5 is arranged at any position. Thus, it is impossible to prevent the inconveniences that the mark position is overlapped to the position of the reading sensor and the mark position is not read.

In order to solve the problem, necessarily, the reading sensor 5 is a movable one and the position of the reading sensor 5 is moved in parallel with the sheet conveying direction so as to prevent the mark position at the position of the reading sensor 5. However, in this case, the printer needs to have a mechanism part which moves the position of the reading sensor 5. Therefore, the conventional printing method using the continuous control of the printers has a problem that a printer apparatus having the mechanism part is increased in size and costs for manufacturing the apparatus rise.

Next, a description is given of a method for continuous control of a printer according to the present invention in order to solve the foregoing problems.

Figure 2:
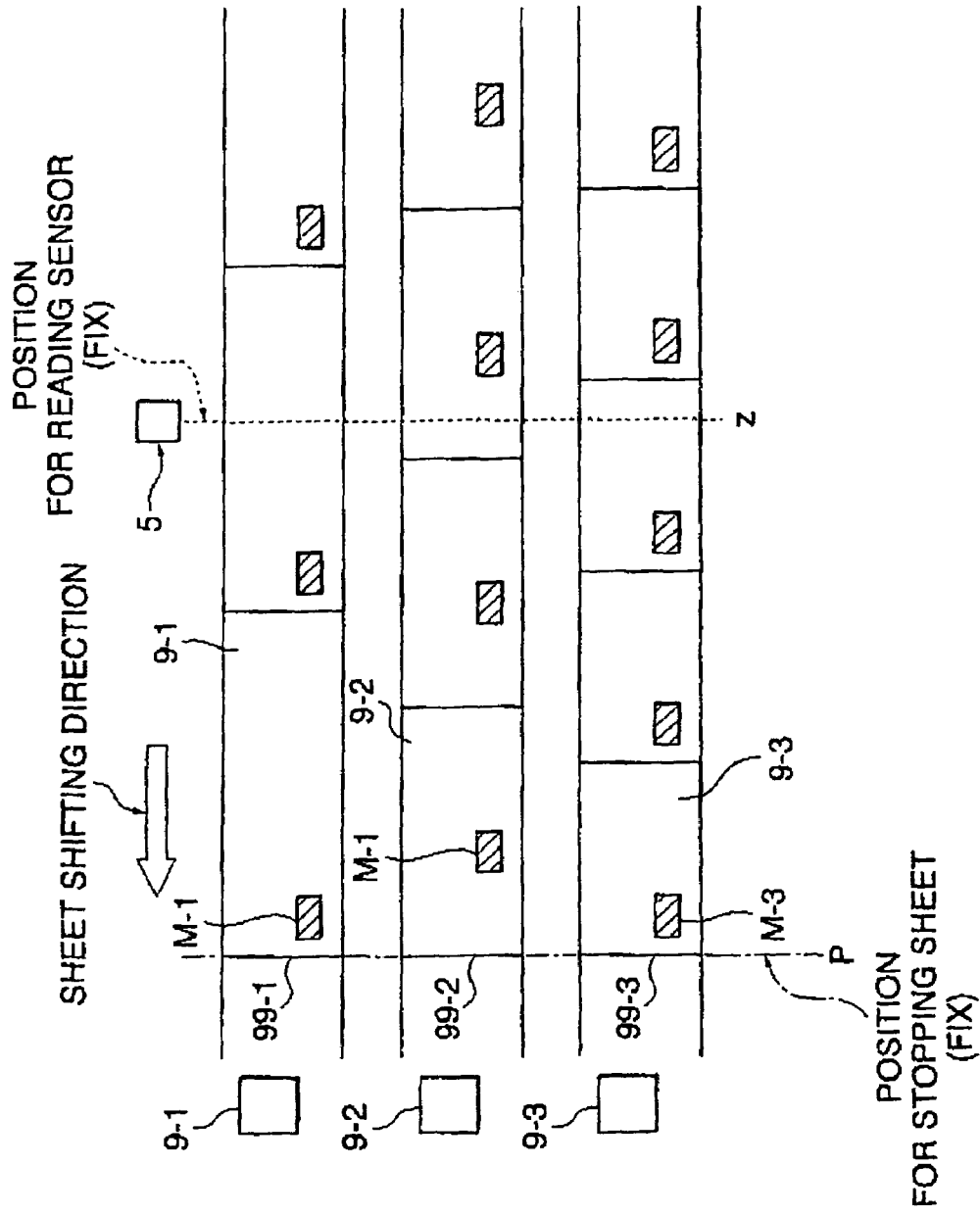
FIG. 2 is a schematic diagram for explaining a method for continuous control operation of printers according to the present invention.

FIG. 2 is a schematic diagram for explaining a method for continuous control operation of printers according to the present invention. Referring to FIG. 2, sheets 9-1 to 9-3 such as a continues sheet or a roll sheet, marks M-1 to M-3 such as a barcode, and a reading sensor 5 are enlargedly viewed, similarly to the case in FIG. 1. Further, it is assumed that plural printers are used and printing data is continuously printed onto the front surfaces and the back surfaces of the sheets 9-1 to 9-3.

When, under the continuous control of the plural printers, image data is printed onto the front surfaces and the back surfaces of the sheets 9-1 to 9-3, referring to FIG. 2, according to the present invention, the position of the mark M-2 formed onto the sheet 9-2 is moved at the back of the positions of the marks M-1 and M-3. Therefore, when the reading sensor 5 is fixed at a position z, it is possible to prevent an overlapping state between the mark position and the position of the reading sensor 5 upon stopping the sheet conveying operation. Thus, when the sheet conveying operation starts again, all the marks (e.g., the marks M-1 to M-3) can be read.

The movement of the mark position indicates that, actually, the mark is not moved but formed at the position for preventing the position of the reading sensor, for example, the mark position is predetermined in accordance with the sheet size or the image data size and the mark is at one position in accordance with one size.

Specifically, under the continuous control using two printers, it is set, as a counting value from the exposure start time per size of all the sheets or per size of the image data, the mark should be formed at which position from the exposure start time of the image data to a photosensitive drum so as to correctly read the mark by a second printer (e.g., slave printer). A printing control part such as a CPU (central processing unit) recognizes the sheet size or the image data size and then the counting value is correctly set, thereby instructing at which position from the exposure start time of the image data to be printed, the mark should be formed.

As mentioned above, according to the present invention, by movably setting the mark position which is formed upon printing the image data on the front surface of the sheet in accordance with the size of the sheet as a printing medium and by preventing the overlapping state between the mark position upon stopping the sheet conveying operation and the position of the reading sensor, all the marks formed on an arbitrary-size sheet can be read. Therefore, according to the present invention, as mentioned in the conventional art (refer to FIG. 1), the mechanism part for moving the position of the reading sensor does not need to be provided and, thus, the apparatus size including the printer and costs are reduced.

Figure 3:
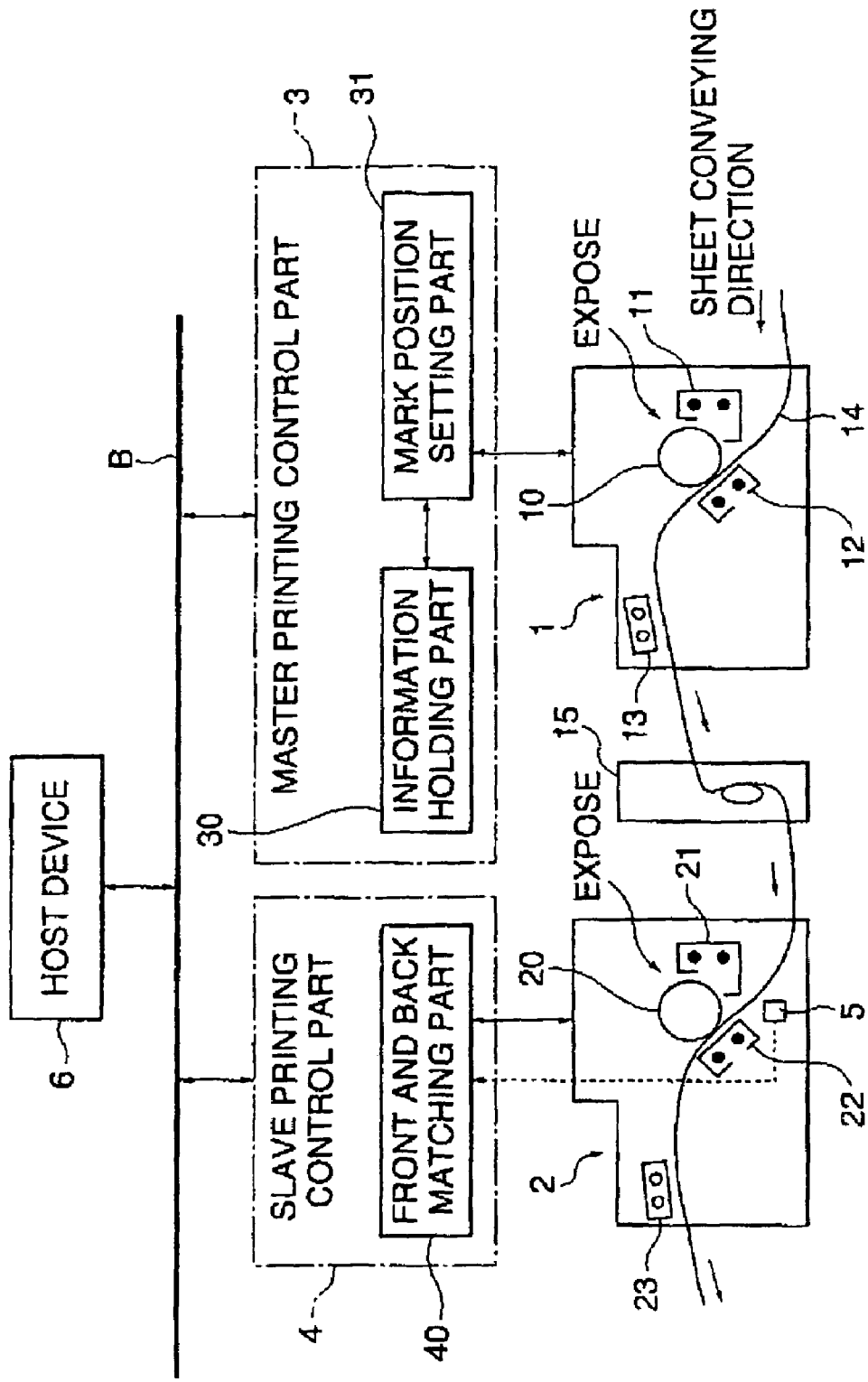
FIG. 3 is a block diagram showing the structure according to a first embodiment of the present invention.

Referring to FIG. 3, according to the first embodiment, a description is given of the simple structure of a printing device which is applied to the case of continuously printing the image data onto the front surface and the back surface of the sheet by use of two printers (including a first printer and a second printer) using electrostatic transfer. Hereinafter, the same components as mentioned before are designated by the same reference numerals.

Referring to FIG. 3, according to the first embodiment, a master printer 1 which prints the image data on the front surface of the sheet is provided as a first printer and a slave printer 2 which prints the image data on the back surface of the sheet is provided as a second printer. Further, a sheet reversing part 15 is arranged to reverse the front and back surfaces of the sheet which is conveyed via a sheet conveying part 14 from the master printer 1. The sheet ejected from the sheet reversing part 15 is sent to the slave printer 2 so as to print the image data on the back surface.

More specifically, the master printer 1 includes: a first photosensitive drum 10 which forms an electrostatic latent image corresponding to the image data on the front surface of the sheet; a first developing unit 11 which develops the electrostatic latent image by use of a developer; a first transfer device 12 which transfers the image data developed by the first developing unit 11 onto the front surface of the sheet; and a first fixing unit 13 which fixes the image data transferred onto the front surface of the sheet by the pressure-increasing and heating operations. In the master printer 1 with the above structure, the image data is formed onto the front surface and the mark such as the barcode indicating the sheet page (or image data) is formed at a predetermined position of the sheet.

On the other hand, the slave printer 2 includes: a second photosensitive drum 20 which forms an electrostatic latent image corresponding to the image data on the back surface of the sheet; a second developing unit 21 which develops the electrostatic latent image by use of the developer; a second transfer device 22 which transfers, on the back surface of the sheet, the image data developed by the first developing unit 21; and a second fixing unit 23 which fixes the image data transferred to the back surface of the sheet by the pressure-increasing operation and the heating operation. Further, the reading sensor 5 (refer to FIG. 2 as mentioned above) is arranged at the position which is apart from the second photosensitive drum 20 by a predetermined distance in the slave printer 2. The reading sensor 5 is used for reading the mark position formed on the sheet transmitted from the sheet reversing part 15 and for recognizing which image data is printed on the front surface of the sheet.

Further, referring to FIG. 3, according to the first embodiment, a first printing control part 3 which controls the printing operation of the master printer 1 and a second printing control part 4 which controls the printing operation of the slave printer 2 are provided. The first and second printing control parts 3 and 4 form a main part of the printing device of the present invention. Preferably, the first and second printing control parts 3 and 4 are implemented by the CPU of the computer.

Furthermore, referring to FIG. 3, according to the first embodiment, a host device 6 including a host computer is connected to the first and second printing control parts 3 and 4 via a bus line B. The host device 6 has a function for supplying an instruction such as a printing command which provides information necessary for the printing operation to the first and second printing control parts 3 and 4.

More specifically, the first printing control part 3 has an information holding part 30 which previously holds information on a relationship between the sheet size or the size of the image data to be printed and the mark position indicating the sheet page or the image data. Preferably, the information holding part 30 is implemented by a RAM (random access memory) and a ROM (read only memory). Further, the first printing control part 3 includes a mark position setting part 31 which sets the mark position on the front surface of the sheet in accordance with the sheet size or the image data size set on the master printer 1 based on the information extracted from the information holding part 30.

Upon setting the mark position without the consideration of the information held in the information holding part 30, the position of the reading sensor 5 in the slave printer 2 stops when the sheet conveying operation (that is, printing operation) stops depending on the sheet size or the size of the image data. Thus, there is a fear that the mark is not read upon restarting the sheet conveying operation. Then, according to the first embodiment, the mark position is set in consideration of the position of the reading sensor 5 upon stopping the printing operation per sheet size to be printed, information of the sheet size set on the master printer 1 is sent to the host device 6 and the master printer 1 prints the image data on the front surface having the mark so as not to overlap the mark position to the position of the reading sensor 5 upon stopping the printing operation.

The second printing control part 4 has a front and back matching part 40 which determines whether or not the information on the printing data on the back surface to be printed is correct based on page information indicated by the mark read by the reading sensor 5. In other words, the front and back matching part 40 has a function which matches the image data on the front surface of the sheet to the image data on the back surface (front and back matching). As a result of the front and back matching using the front and back surfaces matching part 40, when it is determined that the image data on the back surface to be printed is not correct, the operation of the slave printer 2 should stop before exposing the image data on the back surface onto the second photosensitive drum 20.

Referring to FIG. 3, according to the first embodiment, a description is given of a series of operations upon printing the image data on the front and back surfaces of the sheet.

The electrostatic latent image is formed corresponding to the desired image data by selectively exposing the information on the image data on the front surface of the sheet transmitted to the printing control part 3 on the master printer 1 side from the host device 6 with laser beams and LED (light emitting diode) after charging the surface of the first photosensitive drum 10 in the master printer 1. In this case, the mark meaning the page of the image data is formed on the first photosensitive drum 10. Next, the electrostatic latent image is developed by the first developing unit 11 and then it is transferred onto the front surface by the first transfer device 12, thereby forming the image data onto the front surface. Further, the pressure-increasing operation and the heating operation of the first fixing unit 13 enable the completion of the printing operation of the image data to be printed onto the front surface of the sheet.

The mark meaning the page of the image data is printed on the image data printed onto the front surface of the sheet and is ejected from the sheet conveying part 14. The front and back indication of the sheet ejected from the master printer 1 is reversed by the passage through the sheet reversing part 15 of the sheet, and the sheet is conveyed to the slave printer 2. On the sheet conveyed to the slave printer 2 whose front surface has already been printed, the image data printed on the front surface of the sheet is recognized by the reading sensor 5 arranged at a predetermined position in the slave printer 2. In this case, the front and back matching part 40 determines whether or not the image data on the back surface of the sheet printed by the slave printer 2 is correct.

When it is determined that the image data on the back surface of the sheet printed by the slave printer 2 is not data to be printed on the back surface to the image data continuously on the front surface read by the reading sensor 5, the master printer 1 and the slave printer 2 urgently stop and it is notified to an operator that an error is occurred (that is, an abnormal state is caused).

On the other hand, when it is determined that the image data on the back surface of the sheet to be printed by the slave printer 2 is correct, the surface of the second photosensitive drum 20 in the slave printer 2 is charged based on the information on the image data on the back surface of the sheet transmitted to the slave printing control part 4 from the host device 6. After that, the charge front surface is selectively exposed by the laser beams or LED, thereby forming the electrostatic latent image corresponding to the desired image data. Further, the second developing unit 21 develops the electrostatic latent image and the second transfer device 22 transfers the developed image onto the back surface of the sheet, thereby forming the image data onto the back surface of the sheet. Furthermore, the operation for increasing the pressure and the heating operation using the second fixing unit 23 complete the printing operation of the image data to be printed onto the back surface of the sheet.

Here, some processing time is necessary from the timing for recognizing the image data printed onto the front surface of the sheet by the reading sensor 5 to the timing for writing the electrostatic latent image to the second photosensitive drum 20. Therefore, the second photosensitive drum 20 cannot be arranged to the reading sensor 5 adjacently.

Therefore, when the mark is printed at the position of the sheet perforate or the predetermined position from the head portion of the image data, the mark stops at the position of the reading sensor 5 upon stopping the printing operation, depending on the sheet size or the size of the image data. The mark is not correctly read.

In order to solve the inconvenience, the information holding part 30 and the mark position setting part 31 calculate a position which prevents the mark from stopping at the position of the reading sensor 5 upon stopping the printing operation. Further, the information holding part 30 and the mark position setting part 31 movably set the mark position per sheet size or per size of the image data, and the master printer 1 prints the mark, Thus, the reading sensor 5 set to the slave printer 2 can correctly recognize the page printed onto the front surface of the sheet, and can correctly determine which data is printed onto the back surface of the sheet (for example, the second page is printed onto the back surface of the first page and the fourth page is printed onto the back surface of the third page without fail).

The following many processes exist from the timing for reading the mark by the reading sensor 5 to the timing for urgently stopping the master printer 1 and the slave printer 2. That is, there are the processes including a step of correctly reading the mark, a step of recognizing the image data on the front surface of the sheet, a step of determining whether or not the image data to be printed by the slave printer 2 is correct, and a step of, when it is determined that the image data is not correct, urgently stopping the master printer 1 and the slave printer 2 before writing the electrostatic latent image onto the second photosensitive drum 20. The above-mentioned processes exist from the timing for reading the mark to the timing for urgently stopping the master printer 1 and the slave printer 2. Therefore, some processing time is necessary and the second photosensitive drum 20 cannot adjacently be arranged to the reading sensor 5.

Referring to FIG. 3, according to the first embodiment, upon the printing operation in a state in which the sheet size is equal to the size of the image size, the mark printed by the master printer 2 needs to be printed at a position which prevents the mark from stopping at the position of the reading sensor 5 in the slave printer 2 upon stopping the printing operation (first case). It is because when the mark is written at the head portion of the printed sheet (e.g. the position of the sheet perforate) or at the same position from the head portion of the printed image, the mark stops on the reading sensor 5 in the slave printer 2 depending on the sheet size or the image size upon stopping the printing operation and there is a possibility that the mark is not read if the printing operation restarts. In order to prevent the above state, according to the first embodiment, the mark position is set in view of the position of the reading sensor 5 upon stopping the printing operation per size of the printed sheet, information on the set sheet size is sent to the host device 6, and the master printer 1 prints the image data on the front surface arranged at the best position of the mark.

Alternatively, upon exposing the surface of the first photosensitive drum 10 by the laser beams and the LEDs, it is set which raster from the writing start position per page is exposed so as to form the mark and, as a result, the mark position is arbitrarily set. The page marking is possible in consideration of the position of the reading sensor 5 upon stopping the printing operation.

The mark formed by the conventional page marking method is printed at the predetermined position from the start position for writing all the image data, irrespective of the length of the printing sheet. It is because upon executing the exposure per raster, the constant setting is performed so that the mark is printed onto the image data of which number of rasterizing times from the writing start position per page.

According to the first embodiment, the host device 6 issues the printing command per page and sends information on the length of the printing sheet together with the issue of the printing command. After recognizing the information on the length of the printing sheet received by the first printing control part 3, it can be instructed that the mark is printed onto which raster from the exposure start position per page. Thus, the mark position can be moved per length of the printing sheet.

In the printing operation in a state in which the sheet size is not equal to the size of the image data (for example, the printing operation in a state in which one page includes two or more pieces of the image data), the mark position needs to be set per image data piece (second case). In this case, in the host device 6, the mark is arranged at the best position so as to prevent the stop operation of the mark at the position of the reading sensor 5 upon stopping the printing operation in consideration of the position of the reading sensor 5 in the slave printer 2 per size of the image data, and the image data is formed. Thus, the printing device of the present invention is implemented.

Alternatively, similarly to the first case, when the surface of first photosensitive drum 10 is exposed by the laser beams or the LEDs, the mark position is arbitrarily set by setting the position from the head portion of the predetermined image data to print the mark. Therefore, the page marking is possible in consideration of the position of the reading sensor 5 upon stopping the printing operation.

According to the first embodiment of the present invention, it is possible to prevent the problem that the mark stops at the position of the reading sensor 5 in the slave printer 2 upon stopping the printing operation by changing the mark position per sheet size to be printed or per size of the image data. Thus, the mechanism part which moves the position of the reading sensor 5 is not necessary and, therefore, the small size of the apparatus including the printer and low costs are implemented.

Further, according to the first embodiment of the present invention, since the reading sensor 5 is freely arranged in the slave printer 2, limiting indexes are suppressed upon developing the apparatus including the printer and it is possible to easily respond to the specification change.

Figure 4:
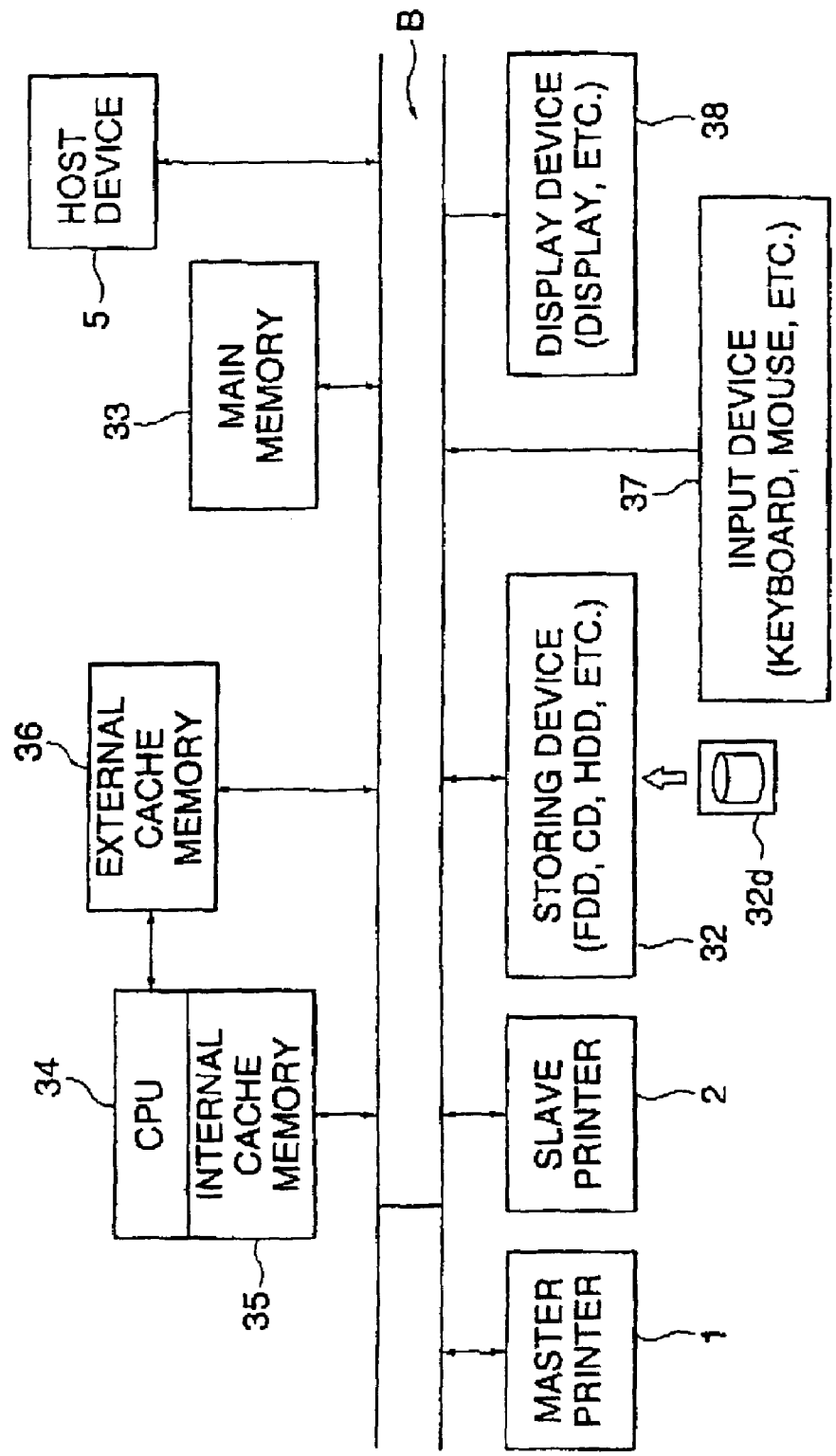
FIG. 4 is a block diagram showing the systematic structure of a computer system to which a printing device is applied according to the present invention.

FIG. 4 is a block diagram showing the systematic structure of a computer system to which a printing device is applied according to the present invention.

Referring to FIG. 4, the first printing control part 3 (refer to FIG. 3) and the second printing control part 4 (refer to FIG. 3) as the features of the printing device of the present invention are executed by a CPU 34 such as a computer. The program for controlling the printing operation of the present invention is software which is stored in a computer-readable storage medium 32d such as a floppy disk (FD), a hard disk, or a compact disk (CD), and is loaded to a main memory 33 when the host device 6 such as the host computer issues the printing command. The storage medium 32d is set in the storing device 32 such as a floppy disk driving device (FDD), a hard disk driving device (HDD), and the compact disk (CD). A target program is loaded to the main memory 33 via the bus line B.

Preferably, the storage medium 32d is one storage medium which stores the programs that function the computer, as a means for previously holding the information on the relationship between the sheet size and the mark position indicating the sheet page, as a means for movably setting the mark position in accordance with the sheet size based on the previously-held information, as a means for forming the thus-set mark upon printing the image data onto the front surface of the sheet, as a means for determining whether or not the front surface matches the back surface by reading the mark by use of the reading sensor, and as a means for printing the image data on the back surface of the sheet when it is determined that the printing data on the front surface of the sheet matches the printing data on the back surface of the sheet.

Alternatively, the storage medium 32d is another storage medium which stores the programs that function the computer, as a means for previously holding the information on the relationship between the sizes of the plural pieces of image data in one page and the mark position indicating each of the pieces of the image data, as a means for movably setting the mark position in accordance with the sizes of the plural pieces of the image data based on the information previously held, as a means for forming the thus-set mark upon printing the plural pieces of the image data on the front surface of the sheet, as a means for determining whether or not the front surface of the sheet matches the back surface by reading the mark by use of the reading sensor, and as a means for printing the plural pieces of image data onto the back surface of the sheet upon determining that the printing data on the front surface of the sheet matches the printing data on the back surface of the sheet.

The program loaded to the main memory 33 is executed on the CPU 34, the cache memory 35 in the CPU 34 or the external cache memory 36 therearound. The display device 38 such as the display and the user interface as the input device 37 such as the keyboard or mouse sets the printing control function using the continuous control of the master printer 1 and the slave printer 2.

Figure 5:
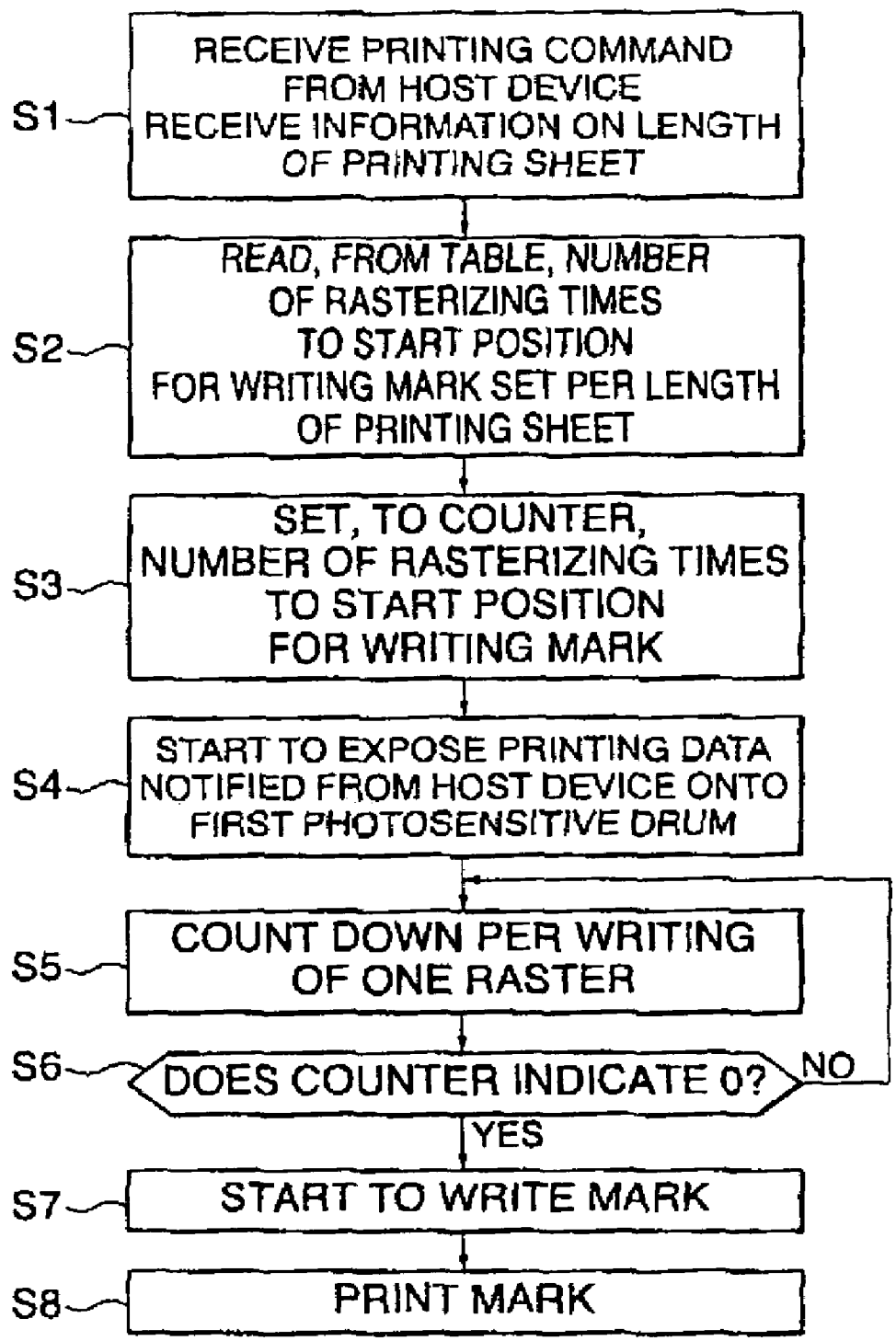
FIG. 5 is a flowchart for explaining a control sequence of a master printer in the printing device according to the present invention.
Figure 6:
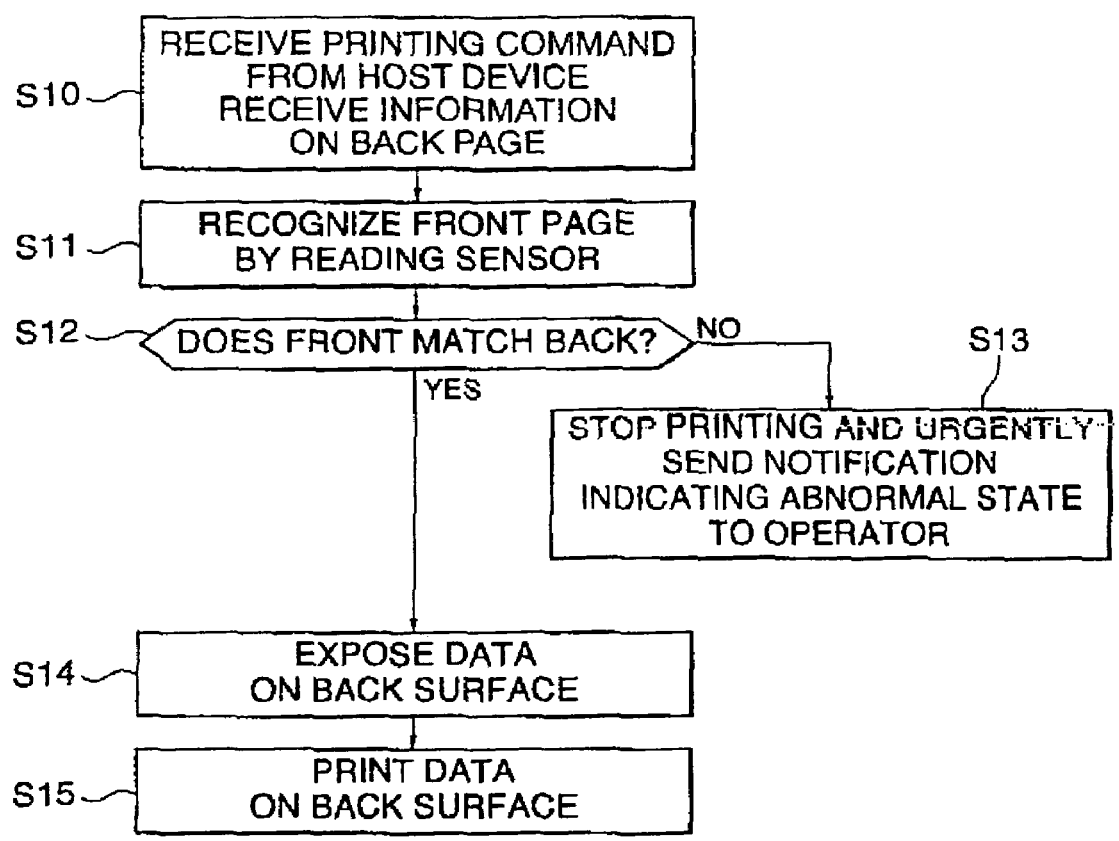
FIG. 6 is a flowchart for a control sequence of a slave printer in th printing device according to the present invention.
Figure 8:
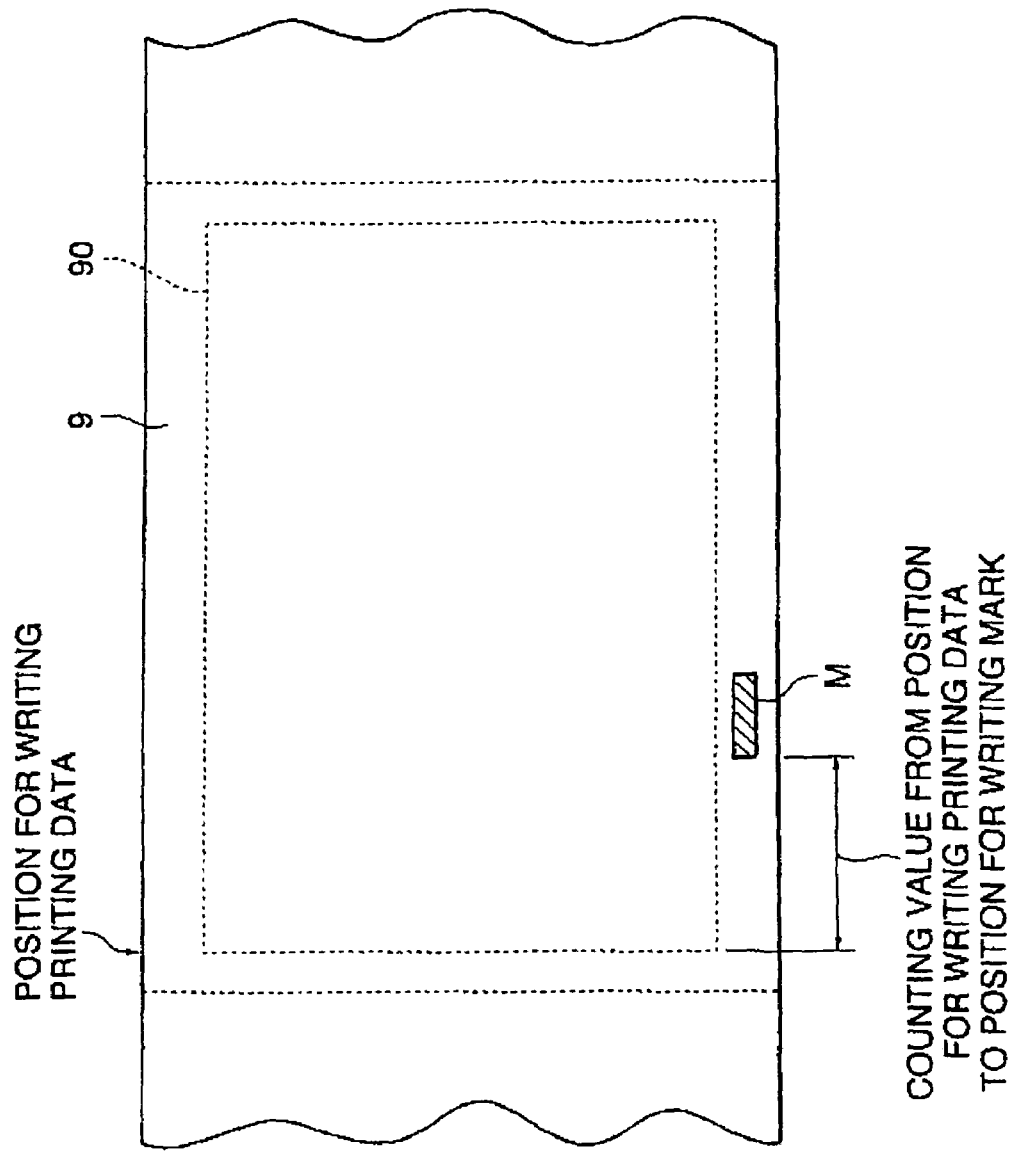
FIG. 8 is a schematic diagram showing a counting value from a start position for writing the printing data to the start position for writing the mark.

FIG. 5 is a flowchart for explaining a control sequence of a master printer in the printing device according to the present invention, FIG. 6 is a flowchart for a control sequence of a slave printer in the printing device according to the present invention, FIG. 7 is a data format diagram showing data on a start position for writing a mark per size of image data and FIG. 8 is a schematic diagram showing a counting value from a start position for writing the printing data to the start position for writing the mark.

A description is given of the operation of the first and second printing control parts in the case of the continuous control for printing the image data onto the front surface and the back surface by the two printers with reference to FIG. 3 according to the first embodiment of the present invention.

In step S1 in FIG. 5, the first printing control part connected to the master printer 1 first receives the printing command from the host device 6 and further receives information on the length of the printing sheet.

Next, the first printing control part 3 reads, from a table, the number of rasterizing times for exposure from the start position for writing the image data (printing data) set per length of the printing sheet to the start position for writing the mark (that is, the number of rasterizing times for exposure until the timing for printing the mark) (step S2).

Further, the first printing control part 3 sets, to the counter, the number of rasterizing times for exposure until the timing for printing the mark (step S3).

The information storing part (refer to FIG. 3) such as a ROM table shown in FIG. 7 stores the distance from the start position for writing the image data to be printed to the start position for writing the mark and the number of rasterizing times for exposure until the timing for printing the mark per size of the image data (that is, per length of the printing sheet). In this case, the size of the image data is expressed by inch unit in an FCB (Forms Control Buffer) length format and, further, the distance from the start position for writing the image data to the start position for writing the mark is expressed by inch unit per size of the image data. However, the number of rasterizing times for exposure until the timing for printing the mark is expressed by hexadecimal because it needs to be set to the counter as the counting value.

Further, the counting value shown in FIG. 8 defines the distance from the start position for writing the image data to be printed to the start position for writing the mark M. Referring to FIG. 8, reference numeral 90 denotes an area of the image data in a sheet 9. Here, it is assumed that the sheet of one page includes two or more pieces of image data. However, when the sheet of one page includes only one piece of the image data, the size of the image data substantially matches the sheet size.

Referring back to FIG. 5, a description is given of the operation of the first printing control part 3 after step S4. As shown in step S4 in FIG. 5, the surface of the first photosensitive drum 10 starts to selectively be exposed in accordance with the image data informed from the host device 6. Thus, the electrostatic latent image corresponding to the image data is formed onto the surface of the first photosensitive drum 10.

In this case, the counting value is counted down per writing of one raster of the image data and the mark writing operation is prepared (step S5).

After that, when the counting value is zero (step S6), the mark starts to be written to the sheet (step S7), and the mark is printed similarly to the image data (step S8).

Further, a description is given of the operation of the second printing control part 20 connected to th slave printer 2 with reference to FIG. 6. As shown in step S10 in FIG. 6, the second printing control part 4 first receives the printing command from the host device 6 and further receives the information on the back surface.

Next, the second printing control part 4 recognizes the image data on the front-surface page based on the information on the mark read by the reading sensor 5 in the salve printer 2 (step S11).

The second printing control part 4 determines whether or not the image data on the front-surface page matches the image data on the back-surface page (step S12).

When the image data on the front-surface page matches the image data on the back-surface page, it is determined that the information on the image data on the back surface is correct and the exposure of the image data on the back surface starts (step S14). Finally, the printing operation of the image data on the back surface is performed (step S15).

On the other hand, when it is determined that the image data on the front-surface page does not match the image data on the back-surface page, it is determined that the information on the image data on the back surface is not correct and the printing operation urgently stops and the occurrence of the abnormal state is informed to the operator (step S13).

In the case of the continuous printing using the master printer 1 and the slave printer 2 in accordance with the flowcharts shown in FIGS. 5 and 6, the position of the mark formation from the start timing for exposing the image data onto the first photosensitive drum is set as the counting value from the exposure start timing per size of the image data or per sheet size so as to correctly read the mark by the slave printer 2. The first printing control part 3 and the second printing control part 4 recognize the size of the image data or the sheet size and, then, correctly sets the counting value, thereby instructing the mark at which position from the exposure starting time of the image data to be printed.

Figure 9:
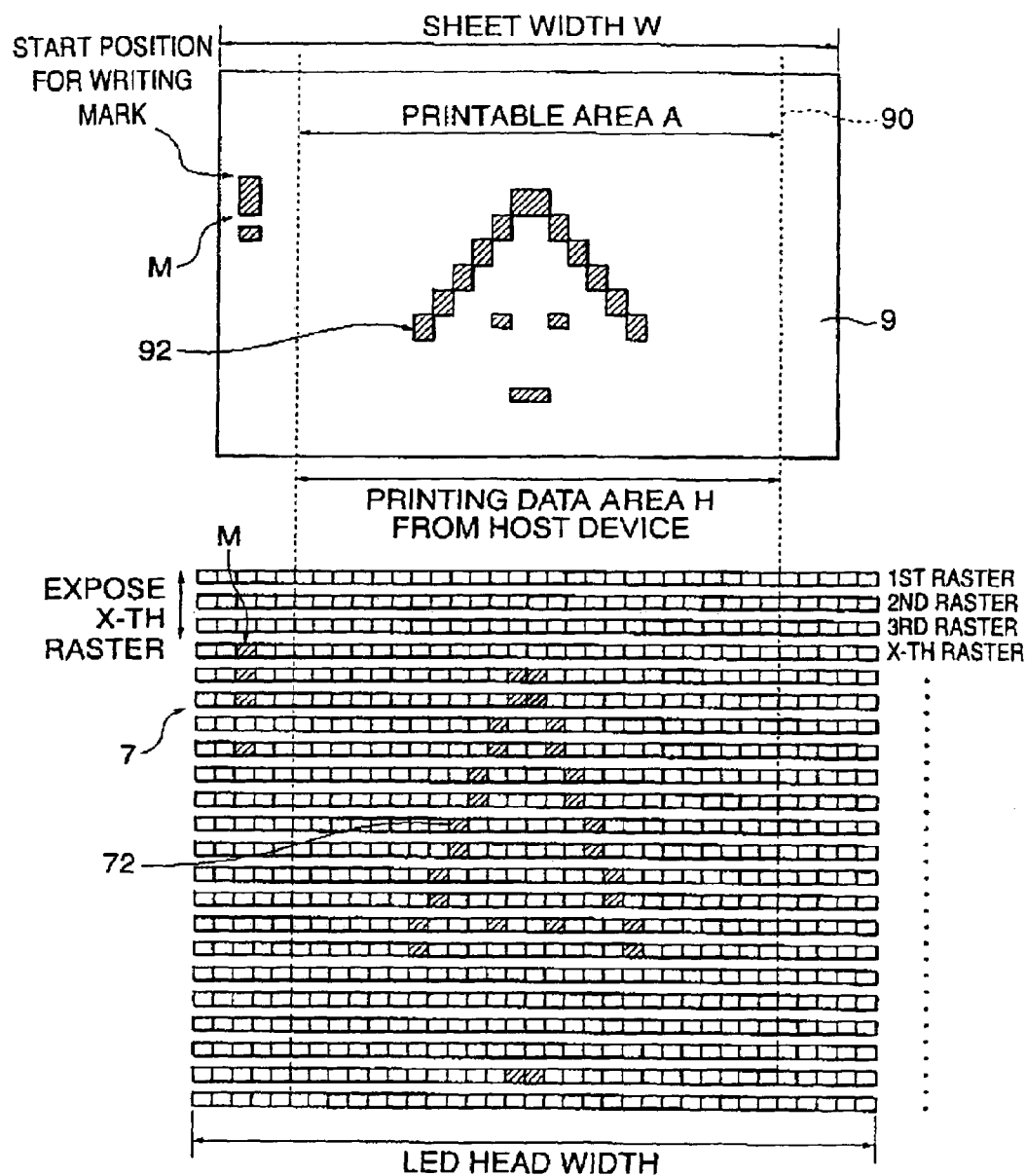
FIG. 9 is a schematic diagram showing a relationship between an electrostatic latent image formed onto a photosensitive drum and a printing result of the printing data.

FIG. 9 is a schematic diagram showing a relationship between an electrostatic latent image formed onto a photosensitive drum and a printing result of the printing data.

Referring to FIG. 9, image data (printing data) 92 informed from the host device 6 (refer to FIG. 3) is set in a predetermined printable area A in the sheet width w as shown in the upper half in FIG. 9. The printable area A corresponds to a printing data area H from the host device 6 and prescribes the width of the image data area 90.

As shown in the lower half in FIG. 9, plural LEDs 7 having an LED head width longer than the printable area A are aligned in the rasterizing direction near the surface of the first photosensitive drum 10 (or the second photosensitive drum 20) (first raster, second raster, . . . , X-th raster, where reference symbol X denotes a positive integer). The image data 92 from the host device 6 is written to the first photosensitive drum 10 as an electrostatic latent image 72 depending on the light-on or light-off operation of the plural LEDs 7 per raster, and is printed onto the front surface of the sheet as the original image data 92 via the development, the transfer, and the fixing processing.

By setting the mark M in the exposure of which raster from the start position for writing the image data 92 per page, the distance from the start position for writing the image data to the start position for writing the mark is determined, thereby printing the mark at the arbitrary position.

Upon stopping the master printer 1 and the slave printer 2, it is set at the exposure of which raster the mark M is written based on the information on the length of the printing sheet informed from the host device so that the mark M is printed at the position for preventing the stop on the reading sensor, and the printing operation is executed. Thus, the mark position can be moved per length of the printing sheet.

Figure 10:
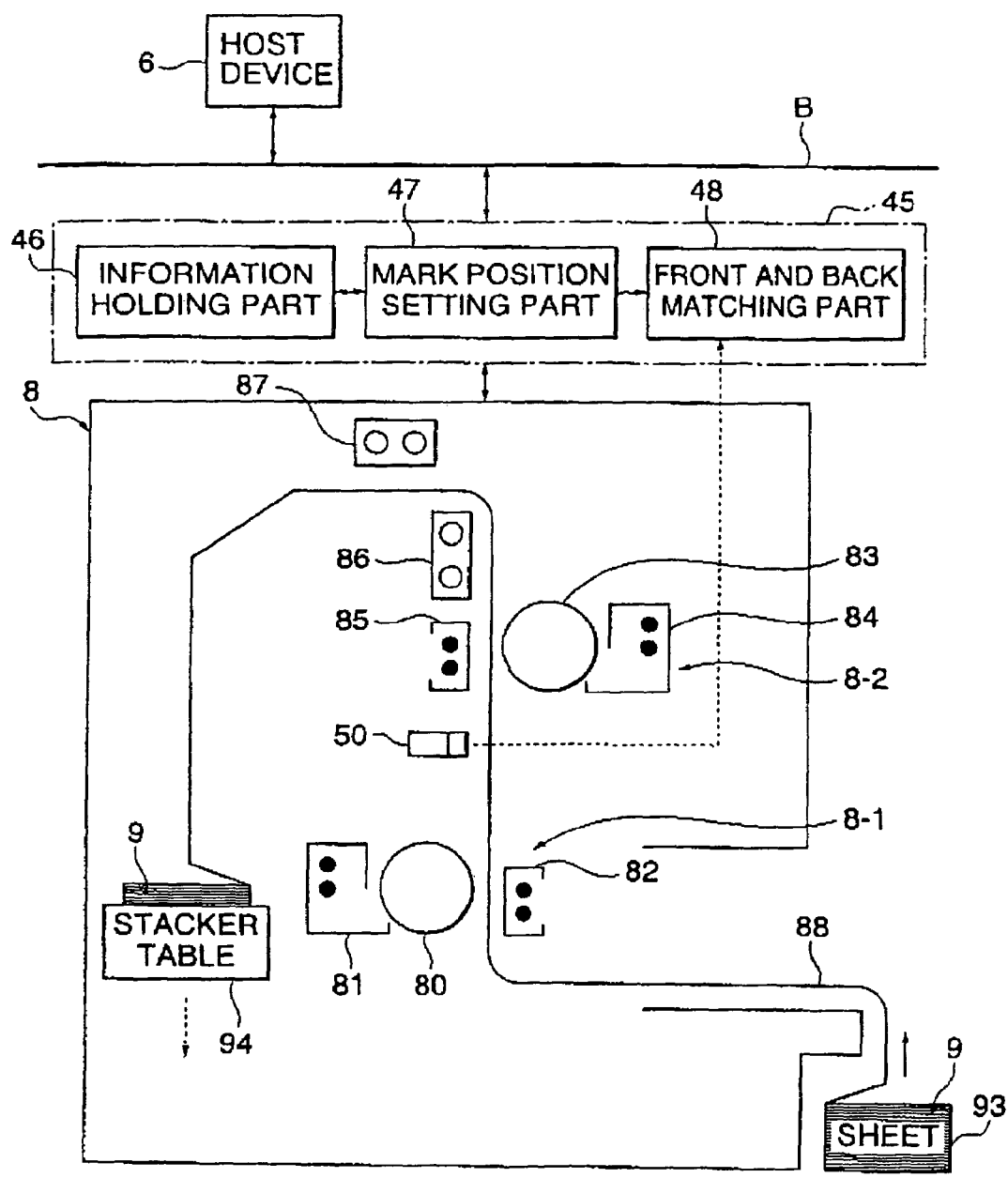
FIG. 10 is a block diagram showing the structure according to a second embodiment of the present invention.

FIG. 10 is a block diagram showing the structure according to the second embodiment of the present invention. According to the second embodiment, a description is given of the simple structure of the printing device which is applied to the case of continuously printing the image data on the front surface and the back surface of the sheet by utilizing one printer using the electrostatic transfer.

Referring to FIG. 10, according to the second embodiment, one printer 8 includes a first printing part 8-1 which prints the image data onto the front surface of the sheet 9 and a second printing part 8-2 which prints the image data onto the back surface of the sheet 9. Unlike the case according to the first embodiment, the image data is continuously printed onto the front surface and the back surface of the sheet 9 without reversing the front surface and the back surface of the sheet 9 which is conveyed via a sheet conveying part 88 from a sheet accommodating part 93. Therefore, the sheet reversing part 15 according to the first embodiment is not necessary.

In detail, the first printing part 8-1 in the printer 8 includes: a first photosensitive drum 80 which forms the electrostatic latent image corresponding to the image data onto the front surface of the sheet 9; a first developing part 81 which develops the electrostatic latent image by use of a developer; a first transfer part 82 which transfers the image data developed by the first developing part 81 onto the front surface of the sheet 9; and a first fixing part 86 which fixes the image data transferred onto the front surface of the sheet 9 by the pressing and heating operations. In the first printing part 8-1 with the above-mentioned structure, the image data is formed onto the front surface of the printer 9 and the mark such as the barcode indicating the page of the sheet 9 (or image data) is formed at a predetermined position of the sheet 9. In particular, the first fixing part 86 fixes the image data onto the front surface of the sheet 9 after ending to transfer the image data onto the back surface of the sheet 9 by the second printing part 8-2.

On the other hand, the second printing part 8-2 in the printer 8 includes: a second photosensitive drum 83 which forms the electrostatic latent image corresponding to the image data onto the back surface of the sheet 9; a second developing part 84 which develops the electrostatic latent image by use of a developer; a second transfer part 85 which transfers, onto the back surface of the sheet 9, the image data developed by the second developing part 84; and a second fixing part 87 which fixes the image data transferred to the back surface of the sheet 9 by the heating and pressing operations. In particular, the second fixing part 87 fixes the image data onto the back surface of the sheet 9 just after the first fixing part 86 ends to fix the image data onto the front surface of the sheet 9. The second fixing part 87 is completely fixed, thus ending the printing operation of the image data onto the front surface and the back surface of the sheet 9. The sheet 9 whose printing operation ends is accommodated in a stacker table 94 via the sheet conveying part 88.

Further, the reading sensor 50 is arranged at the position apart from the second photosensitive drum 83 by a predetermined distance. The reading sensor 50 reads the mark position formed to the sheet 9 to be fed from the first printing part 8-1, and recognizes which image data is printed onto the front surface of the sheet 9.

Furthermore, referring to FIG. 10, according to the second embodiment, Sprinting control part 45 is provided to control the first printing part 8-1 and the second printing part 8-2. The printing control part 45 forms a main part of the printing device of the present invention. Preferably, the printing control part 45 is implemented by the CPU in the computer.

In addition, referring to FIG. 10 according to the second embodiment, the host device 6 including the host computer is connected to the printing control part 45 via the bus line B, similarly to the first embodiment, The host device 6 has a function for issuing an instruction such as the printing command to the printing control part 45 and for providing the information necessary for the printing operation.

More specifically, the printing control part 45 includes an information holding part 46 which previously holds information on a relationship between the sheet size or the size of the image data to be printed and the mark position indicating the sheet page or the image data. Preferably, the information holding part 46 is implemented by a RAM or ROM in the computer. Further, the printing control part 45 includes a mark position setting part 47 which sets the mark position onto the front surface of the sheet 9 in accordance with the size of the sheet to be printed or the size of the image data based on the information extracted from the information holding part 46.

When the mark position is set without the consideration of the information held in the information holding part 46, the mark stops at the position of the reading sensor 50 depending on the sheet size or the size of the image data upon stopping the printing operation of the printer 8. Then, there is a danger that the mark is not read upon restarting the sheet conveying operation. According to the second embodiment, the mark position is set in view of the position of the reading sensor 50 per size of the sheet or the size of the image data to be printed or upon stopping the printing operation. The information on the set sheet size or the set size of the image data is sent to the host device 6. Then, the first printing part 8-1 prints the image data onto the front surface on which the mark is arranged so as not to overlap the mark position to the position of the reading sensor 50 upon stopping the printing operation.

Further, the printing control part 45 includes a front and back matching part 48 which determines whether or not the information on the printing data on the back surface to be printed is correct based on the page information indicated by the mark read by the reading sensor 5. In other words, the front and back matching part 48 has a function which matches the image data on the front surface of the sheet 9 to the image data on the back surface (matching of the front and the back surfaces). As a result of matching the front surface to the back surface by the front and back matching part 48, when it is determined that the image data on the back surface to be printed is not correct, the printing operation of the printer 8 must stop before exposing the image data on the back surface onto the second photosensitive drum 83.

Next, a description is given of a series of operations upon printing the image data on the front surface and the back surface of the sheet 9 in the second embodiment shown in FIG. 10.

First, the surface of the first photosensitive drum 80 in the printer 8 is charged based on the information on the image data onto the front surface of the sheet 9 transmitted to the printing control part 45 from the host device 6. After that, the charged surface is selectively exposed by the laser beams and the LEDs, thereby forming the electrostatic latent image corresponding to the desired image data. In this case, the mark indicating the page of the image data is formed onto the first photosensitive drum 80. Sequentially, the electrostatic latent image is developed by the first developing part 81 and then the first transfer part 82 transfers the developed image onto the front surface of the sheet 9, thereby forming the image data onto the front surface of the sheet 9.

As mentioned above, the image data formed onto the front surface of the sheet 9 has the mark indicating the page of the image data and is conveyed to the second printing part 8-2. The reading sensor 50 arranged at the predetermined position recognizes the image data printed onto the front surface of the sheet 9 conveyed to the second printing part 8-2. In this case, the front and back matching part 48 determines whether or not the image data on the back surface of the sheet 9 to be printed is correct.

When it is determined that the image data on the back surface of the sheet 9 to be printed is not the data to be printed on the back surface to follow the image data on the front surface read by the reading sensor 50, the printer 8 urgently stops and the occurrence of errors is notified to the operator.

When it is determined that image data on the back surface of the sheet 9 to be printed is correct, the surface of the second photosensitive drum 83 is charged based on the information on the image data onto the back surface of the sheet 9 transmitted to the printing control part 45 from the host device 6. After that, the charged surface is selectively exposed by the laser beams and the LEDs, thereby forming the electrostatic latent image corresponding to the desired image data. Further, the second developing unit 84 develops the electrostatic latent image and the developed image is transferred onto the back surface of the sheet 9 by the second transfer part 85, thereby forming the image data onto the back surface of the sheet 9. After that, the second fixing part 86 presses and heats the image data, thus completing the printing operation of the image data to be printed onto the front surface of the sheet 9. Finally, the image data is pressed and heated by the second fixing part 87, thereby ending the printing operation of the image data to be printed onto the back surface of the sheet 9.

According to the second embodiment, referring to FIG. 10, the first case and the second case are considered. That is, in the first case, the printing operation is performed when the sheet size is equal to the size of the image data and, in the second case, the printing operation is performed when the sheet size is not equal to the size of the image data (for example, the printing operation is performed when one page includes two or more pieces of the image data). However, in both the first and second cases, similarly to the case according to the first embodiment, the mark position is preset in view of the position of the reading sensor per size of the sheet or size of the image data to be printed upon stopping the printing operation, and the image data on the front surface having the mark can be printed at the best position.

As mentioned above, according to the second embodiment of the present invention, only one printer is used and the mark position is changed per size of the sheet or size of the image data to be printed, thus preventing the problem that the mark stops at the position of the reading sensor in the slave printer upon stopping the printing operation. Since the apparatus structure is simplified as compared with the structure according to the first embodiment, the apparatus including the printer is reduced in size and costs are reduced.

Further, according to the second embodiment of the present invention, similarly to the first embodiment, the reading printer in the printer is freely arranged, thus reducing the limiting indexes upon the development of apparatuses including the printer. The specification can easily be changed.

The above description is given of the example of the printing device to which the present invention is applied when the image data is continuously printed onto the front and back surfaces of the sheet by use of one or two printers according to the first and second embodiments. In a printing device to which the present invention is applied when the image data is printed with two colors onto a single surface (e.g., front surface) of the sheet by use of one or two printers, the same operations and advantages as those according to the first and second embodiments are obtained by changing the mark position per size of the sheet or size of the image data to be printed.

The invention claimed is:

1. A printing device comprising a first printer and a second printer which continuously print printing data onto a printing medium, the second printer comprising a reading sensor, the first printer first printing the printing data onto the printing medium by forming a mark indicating a page of the printing medium, the reading sensor subsequently reading the mark and matching printing surfaces of the printing medium to be printed by the first and second printers, the second printer thereafter printing the printing data onto the printing medium, the printing device comprising:
   an information holding part which previously holds information on a relationship between a size of the printing medium and a position of the mark; and
   a mark position setting part which movably sets the mark position based on the information held in the information holding part in accordance with the size of the printing medium.

2. The printing device according to claim 1, wherein, when, as a result of matching the printing surfaces of the printing medium to be printed by the first and second printers, it is determined that the printing data on the printing surface to be printed by the first printer does not match the printing data on the printing surface to be printed by the second printer, printing operations of the first and second printers stop and an occurrence of an abnormal state is notified.

3. A printing device comprising a first printer and a second printer which continuously print plural pieces of printing data onto a printing medium, the second printer comprising a reading sensor, the first printer first printing the plural pieces of printing data onto the printing medium by forming a mark indicating each of the plural pieces of the printing data, the reading sensor subsequently reading the mark and matching printing surfaces of the printing medium to be printed by the first and second printers, the second printer thereafter printing the plural pieces of printing data onto the printing medium, the printing device comprising:
- an information holding part which previously holds information on a relationship between sizes of the plural pieces of printing data and the mark position; and
- a mark position setting part which movably sets the mark position based on the information held in the information holding part in accordance with the sizes of the plural pieces of printing data.

4. The printing device according to claim 3, wherein, when, as a result of matching the printing surfaces of the printing medium to be printed by the first and second printers, it is determined that the printing data on the printing surface to be printed by the first printer does not match the printing data on the printing surface to be printed by the second printer, printing operations of the first and second printers stop and an occurrence of an abnormal state is notified.

5. A printing method that continuously prints printing data onto a printing medium, comprising the steps of:
- previously holding information on a relationship between a size of the printing medium and a position of the mark;
- movably setting the position of the mark based on the previously-held information in accordance with the size of the printing medium;
- forming the set mark upon printing the printing data onto a printing surface of the printing medium to be printed first;
- reading the mark by a reading sensor and matching printing surfaces of the printing medium to be printed first and second; and
- printing the printing data onto the printing surface of the printing medium to be printed second when it is determined that the printing data onto the printing surface of the printing medium to be printed first matches the printing data onto the printing surface of the printing medium to be printed second.

6. A printing method that continuously prints plural pieces of printing data, comprising the steps of:
- previously holding information on a relationship between the sizes of the plural pieces of printing data and a position of a mark indicating the plural pieces of printing data;
- movably setting the mark position based on the previously-held information in accordance with the sizes of the plural pieces of printing data;
- forming the set mark upon printing the plural pieces of printing data onto a printing surface of the printing medium to be printed first;
- reading the mark by a reading sensor and matching printing surfaces of the printing medium to be printed first and second; and
- printing the plural pieces of printing data onto the printing surface of the printing medium to be printed second when it is determined that the plural pieces of printing data onto the printing surface of the printing medium to be printed first match the plural pieces of printing data onto the printing surface of the printing medium to be printed second.

7. A computer-readable storage medium that stores a program which continuously prints printing data onto a printing medium, wherein the program enables a computer to function as:
- means for previously holding information on a relationship between a size of the printing medium and a position of a mark indicating a page of the printing medium;
- means for movably setting the mark position based on the previously-held information in accordance with the size of the printing medium;
- means for forming the set mark upon printing the printing data onto a printing surface of the printing medium to be printed first;
- means for reading the mark by a reading sensor and matching printing surfaces of the printing medium to be printed first and second; and
- means for printing the printing data onto the printing surface of the printing medium to be printed second when it is determined that the printing data onto the printing surface of the printing medium to be printed first matches the printing data onto the printing surface of the printing medium to be printed second.

8. A computer-readable storage medium that stores a program which continuously prints plural pieces of printing data onto a printing medium, wherein the program enables a computer to function as:
- means for previously holding information on a relationship between sizes of the plural pieces of printing data and a position of a mark indicating each of the plural pieces of printing data;
- means for movably setting the mark position based on the previously-held information in accordance with the sizes of the plural pieces of printing data;
- means for forming the set mark upon printing the plural pieces of printing data onto a printing surface of the printing medium to be printed first;
- means for reading the mark by a reading sensor and matching printing surfaces of the printing medium to be printed first and second; and
- means for printing the plural pieces of printing data onto the printing surface of the printing medium to be printed second when it is determined that the printing data onto the printing surface of the printing medium to be printed first matches the printing data onto the printing surface of the printing medium to be printed second.

* * * * *